United States Patent [19]

Rather et al.

[11] Patent Number: 4,825,062

[45] Date of Patent: Apr. 25, 1989

[54] EXTENDABLE LARGE APERTURE PHASED ARRAY MIRROR SYSTEM

[75] Inventors: John D. G. Rather, Washington, D.C.; Gregory H. Ames, Colorado Springs, Colo.; Edward K. Conklin, Hermosa Beach, Calif.; Albert J. Lazzarini, Colorado Springs, Colo.; Joseph Mangano, Vienna, Va.; Bobby L. Ulich, Tucson, Ariz.

[73] Assignee: Kaman Aerospace Corporation, Bloomfield, Conn.

[21] Appl. No.: 114,540

[22] Filed: Oct. 29, 1987

[51] Int. Cl.[4] ............................................. G01V 1/20
[52] U.S. Cl. ..................................... 250/201; 350/611
[58] Field of Search ................. 250/201; 350/611, 613

[56] References Cited

U.S. PATENT DOCUMENTS

| | | | |
|---|---|---|---|
| 4,393,303 | 7/1985 | Spinhirne | 250/201 |
| 4,399,356 | 8/1983 | Feinleib | 250/201 |
| 4,467,186 | 8/1984 | Goralnick et al. | 250/201 |
| 4,471,447 | 9/1984 | Williams et al. | 250/201 |
| 4,737,621 | 4/1988 | Gonsiorowski et al. | 250/201 |

OTHER PUBLICATIONS

The 15-Meter National New Technology Telescope, L. D. Barr, et al. (un-published).
A Proposal for a Ground-Based 10-Meter Hel Beam Expander, DARPA-U-1125, May 1983, ppi-B10.
Generation of Telescopes, Colin A. Ronin, Excerpt from "Deep Space" MacMillan Press (1982) pp. 26, 27.
A 10-Meter Telescope for Millimeter and Sub-Millimeter Astronomy, Robert B. Leighton, pp. 1-84, May 1978.
The Submillimeter Giants, Sky and Telescope Magazine, Aug. 1985, pp. 119-123.
Effects of Primary Mirror Segmentation on Telescope Image Quality, T. S. Mast et al., SPIE, vol. 332 Advanced Technology Optical Telescopes (1982) pp. 123-133.

Primary Examiner—David C. Nelms
Attorney, Agent, or Firm—McCormick, Paulding & Huber

[57] ABSTRACT

An extendable large aperture phased array mirror system includes a plurality of mirror segments cooperatively configured to receive an incoming electromagnetic beam. In response to signals from a sensor indicative of wavefront distortion in the beam, a control apparatus displaces a plurality of segment actuators to configure the mirror segments to generate an outgoing conjugate phase electromagnetic beam.

43 Claims, 3 Drawing Sheets

EXTENDABLE LARGE APERTURE PHASED ARRAY MIRROR SYSTEM

TECHNICAL FIELD

This invention relates to adaptive optical elements and more particularly to extendable large aperture mirror systems having a phased array of mirror segments and a method for controlling the same.

BACKGROUND OF THE INVENTION

It is well known that the size of the primary aperture of an optical instrument limits its resolving power. In the past, efforts to increase aperture size were frustrated by the scaling problems associated with monolithic optical elements. For certain applications, such as radio astronomy, the long wave lengths of interest have allowed the use of reflectors comprised of segmented elements. Optical mirrors made from segmented optical elements can have both effectively larger apertures and lower costs than corresponding monolithic optical elements, but require actuators and control mechanisms whose precision and complexity dramatically increase with visible and short wavelength radiation applications and with the number of optical elements. An example of a segmented optical element is found in the primary aperture of the Keck ten meter telescope under construction in Hawaii, a description of which is found in the Keck Observatory Report Number 90, published by the Keck Observatory, of the California Institute of Technology, Pasedena, Ca. and, the University of California, Berkeley.

To achieve near diffraction limited performance, ground based optical systems require compensation for atmospheric propagation effects on optical ray paths. Efforts to compensate for the effects of the atmosphere on propagating optical beam wavefronts has led to the development of deformable membrane mirrors which allow an optical surface to be modulated to approximate the conjugate shape of the wavefront distortions introduced between the optic elements and the focal object, thus permitting optical quality approaching that in vacuum.

Early adaptive optics developments were directed towards ground and airborne systems using small diameter deformable and/or segmented secondary or tertiary optical elements to correct the performance of primary mirrors having diameters in the 1–2 meter range. As ground-to-space applications took on greater reality in the 1970s, the deformable mirror technology developed for small aperture systems was directed toward solving the turbulence problem for ever larger optical elements, thus necessitating scaling of the number of adaptive elements (or zones) to many hundreds or thousands.

However, existing deformable mirror technology has many drawbacks which limit upward scaling. Required sub-aperture adaptive optical element size scales inversely with beam expansion ratio. Therefore, if adaptive optical compensation does not take place in the primary beam aperture, optical element displacement actuators used in a sub-aperture (for example a tertiary) optical element must have a packing density which increases with the square of the beam expansion ratio. Such closely spaced actuators will exacerbate the already severe system cooling requirements in laser beam expanders and limit the performance of imaging systems. Moreover, existing wavefront conjugation algorithms used to position the actuators are computation intensive for large mirrors requiring many adaptive elements and require the inversion of large matrices and/or construction of expensive and complex ad hoc hardware arrays. Limited actuator stroke suitable for small deformable mirrors (less than 1 meter in diameter) is not adequate for the displacement magnitude (approximately one hundred microns) required of the conjugating surface associated with the optical path differences that will be encountered across 10 meter class primary optical apertures. In addition, optical system architectures based on either true single element monolithic primary mirrors or semimonolithic mirrors comprised of moderately large segments are almost totally inflexible with regard to design or operational changes.

SUMMARY OF THE INVENTION

It is an object of the present invention to provide a phased array optical mirror system having an extendable aperture.

Another object of the present invention is to provide a phased array mirror system that generates the phase conjugate of an incoming electromagnetic beam.

Still another aspect of the present invention is to provide a phased array mirror system comprised of mirror segments that include local signal processing within each segment.

A further object of the present invention is to provide mirror segments for a phased array mirror system that are fabricated according to semiconductor batch fabrication methods.

Yet another object of the present invention is to provide a phased array mirror system which is without $2n\pi$ phase ambiguities.

Another object of the present invention is to provide a phased array mirror system which requires only signals indicative of the local received wavefront rather than requiring global, mirror-wide wavefront reconstruction.

According to the present invention, an extendable large aperture phased array mirror system for directing an electromagnetic beam that has an optically distorted wavefront includes a plurality of optical mirror segments each having opposed front and rear surfaces. These surfaces are bounded by a plurality of edges formed by intersection with a corresponding plurality of side surfaces. The segments cooperatively receive and reflect the electromagnetic beam at the front surface of each segment. A plurality of displacement sensors generates signals indicative of the relative position of the front surface of the segments. A plurality of displacement actuators, each responsive to control signals, are connected to the rear surfaces of the segments. That is, each rear surface is connected at a corresponding number of points to these or some other plurality of actuators which generate linear and angular segment movement relative to a segment axis substantially perpendicular to the segment front and rear surfaces that substantially correspond to a mean segment position approximating the desired ideal optical figure. An optical wavefront sensor receives a portion of an electromagnetic reference beam and provides signals indicative of its wavefront distortion relative to an ideal wavefront. A controller transmits these signals directly to each segment, wherein are generated in-situ actuator control signals to position the mirror segments so as to generate a conjugate phase reflected electromagnetic beam without the need for external wavefront reconstruction addressing the full plurality of mirror segments on a one-to-one basis.

According to another aspect of the present invention, a mirror segment for use with a phased array mirror includes a front piece having an optically polished front surface and opposed rear surface. The front piece is fixed to a segment core at a first surface thereof. The segment core also includes an opposed second surface adapted to receive a plurality of segment actuators and electrical circuit elements. Included in the segment core are a plurality of internal cooling vents and ducts adjacent to segment core first surface. Also included on the sides of the segment core are precision edge sensors for measuring displacements with respect to adjacent segments.

DESCRIPTION OF THE PREFERRED EMBODIMENT

Figure 1:
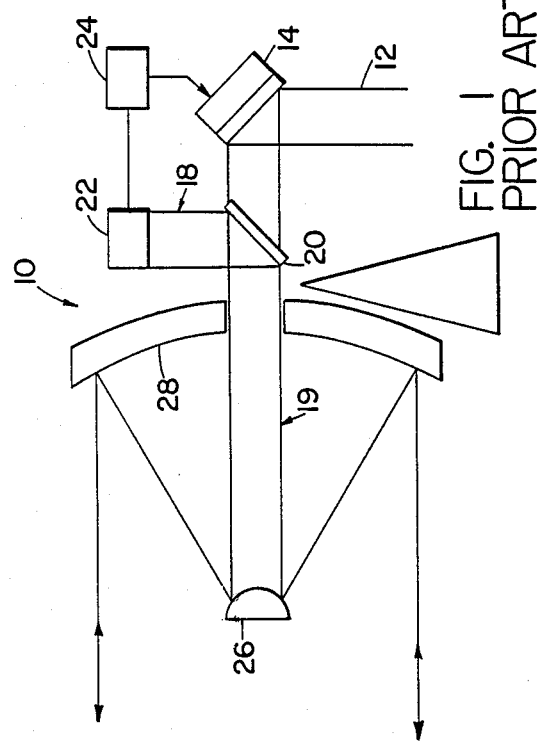
FIG. 1 is a schematic illustration of a conventional large aperture adaptive beam director system.

Referring now to FIG. 1, there is illustrated in simplified block diagram format a conventional adaptive optics system mated with a large aperture telescope or beam director system 10. Typically, existing telescopes or beam director systems receive or transmit the desired rays (beam 12) at a deformable adaptive mirror system 14. The adaptive mirror system having a smaller diameter compared with a primary mirror may be either a deformable membrane mirror or a segmented mirror, although deformable membrane mirrors are utilized in all presently operational systems. The deformable mirror system 14 outputs a reformed, phase conjugated optical beam based upon control information derived from the incoming beam 18 from the target object, not shown, a portion of which is sampled by a beam splitter 20 and provided to a wavefront sensor 22. The wavefront sensor is of a type known in the art, and provides signals to a wavefront reconstructor 24. The wavefront reconstructor computes control signals for actuators in the system 14 which deform or otherwise alter the adaptive mirror system to generate a conjugate beam 19.

For an outgoing laser beam, the reconstructed conjugate beam is received by a conventional reflector 26 which provides the beam to a monolithic primary aperture mirror 28 before being redirected to a target (not shown). The conjugated beam 19 is ideally modified such that all environmentally induced distortions have been corrected and the target receives maximum energy from a beam with near perfect structure. As detailed hereinabove, this conventional apparatus has several serious drawbacks. In addition to substantial problems encountered in upwardly scaling a monolithic mirror or a mirror composed of a relatively small number of large monolithic segments such as the Keck telescope, the conventional beam director of FIG. 1 is burdened by the need for a wavefront reconstructor 24.

Moreover, the actuator packing density of adaptive mirror system 14 increases by the square of the magnification of the beam expander. For example, in order to compensate for a worst case atmospheric disturbance coherence scale size of 2 centimeters using a 6:1 beam expansion ratio, the actuators would necessarily be spaced only 3.3 millimeters apart if adaptive compensation to the beam is performed elsewhere in the optical train rather than at the primary aperture. This substantially increases the probability of cross-talk among control actuators. In addition, the added complexity associated with cooling a small active mirror puts severe stress on the design.

Figure 2:
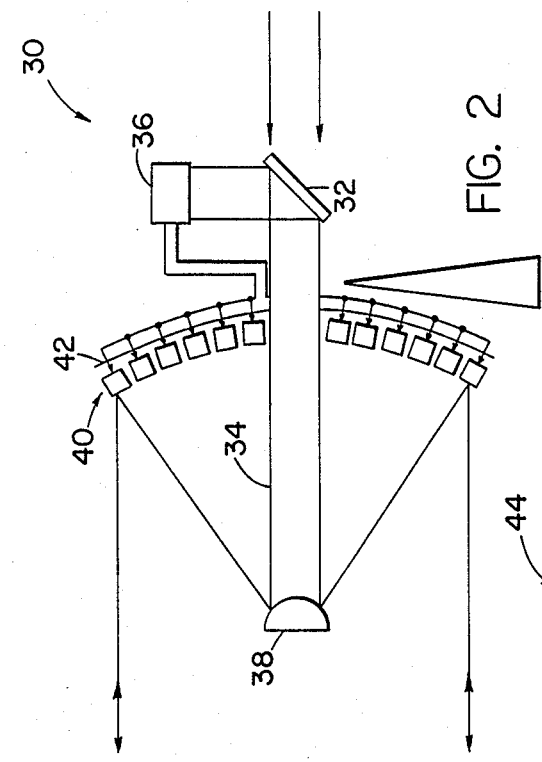
FIG. 2 is a simplified block diagram of an extendable large aperture phased array mirror system provided according to the present invention.

FIG. 2 is a simplified block diagram of an extendable large aperture phased array mirror system provided according to the present invention. The mirror system 30 is also known according to the acronym "PAMELA" which stands for Phased Array Mirror Extendable Large Aperture. The system of FIG. 2 is exemplary of a high power beam expander or an imaging telescope. For example, if a free electron laser operating with an average beam power of interest for high power applications is assumed as the incident beam, other limiting factors of the subsystem can be determined. A large aperture diameter is mandated because of a number of physical constraints. Consideration must be given to the limitation of Raman scattering in the uplink optical path. The average beam intensity must be limited to avoid thermal blooming. The required beam divergence is mission dependent but generally requires large apertures. Assuming a generic capability of a mirror to survive with a large amount of absorbed power, the limiting value of the absorption-diameter product is usually set by the size of the secondary mirror. If this criterion is exceeded, the mirror deformation and locally induced heat generated "seeing" upon the secondary and other optical elements in the optical train must be compensated for by the adaptive control subsystem. Such compensation is extremely difficult for temperature gradients between the surface and the ambient air of greater than 10° C. Hence, it is desirable to make the primary and secondary mirror diameters large enough so that none of the foregoing conditions is violated. Enlarging the diameter of the optics dilutes the laser flux as required at all points in the beam path. Hence, the ability to build arbitrarily large optics as facilitated by the present invention is extremely important for future laser system development.

As detailed hereinafter, the preferred mirror 40 includes a plurality of individual segments grouped into clusters cooperatively configured to comprise the mirror. Each of the individual segments has a plurality (three in the preferred embodiment) of addressable displacement actuators for altering the position of the segment along a displacement axis, and establishing two tilt angles relative to adjacent segments. To sense tilt and displacement, each segment has associated with it a plurality of displacement sensors, described in more detail hereinafter which sense its position relative to each of the adjacent segments. The system 30 includes a beam splitter or chopper wheel 32 which receives an incoming light beam from the direction of a target (not shown) in the same manner as does system 10 in FIG. 1. The beam splitter samples the incoming beam and provides it to a wavefront sensor 36. The wavefront sensor measures the perturbations of the beam 34 that have traversed the atmosphere and optical system and relays this data directly back to segments of mirror 40. Unlike system 10, no wavefront reconstructor is required in this functional control loop because each segment contains the required processing electronics to control the segments in a manner to be detailed hereinafter. As in the case of the system 10 of FIG. 1, the incident beam is provided to a conventional reflector 38 which provides the beam to the segmented, phased array mirror 40.

The actuators move in response to control signals generated on each segment by a local controller 42 in response to the signals from the wavefront sensor and the displacement sensors. As a result of segment motion, a deformed optical surface is created which behaves like a phase conjugating continuous phase sheet mirror, but with much larger dynamic range, and with simpler control algorithms than the conventional system described with respect to FIG. 1.

Due to the large mirror size, a much cooler environment results permitting management of very high power laser beams without heating active elements, as is the case with the system of FIG. 1. Moreover, since the segments of the primary mirror are demagnified back through the optical train they can be repositioned to correct for small scale, large amplitude disturbances occurring anywhere in the beam expander system, such as thermal distortions on secondary mirrors and thermally induced disturbances in the air path.

Those skilled in the art will note that the long stroke afforded by a mirror system provided according to the present invention provides the uniquely important capability for modulo-zero corrections over greater than 100 wave lengths and therefore without 2n$\pi$ phase ambiguities. This extremely large dynamic range can easily compensate for the largest wave length aberrations that can be imposed by the atmosphere or by mechanical or thermal distortions in the optical train.

As detailed hereinafter, the wavefront sensor can be any of the type known in the art which provides information regarding the distortions in the incoming beam. An interferometer or other optical device is used to measure phase. An alternative technique employs an electro-optical tilt sensing system using Hartmann-type displacement sensing to provide wavefront tilt information. In the preferred embodiment, a modified Hartmann-type wavefront tilt sensor provides inputs which combine on each segment with displacement sensor measurements for edge matching to provide information to a control apparatus on each segment that generates actuator displacement signals in accordance with algorithms described hereinafter.

Figure 3:
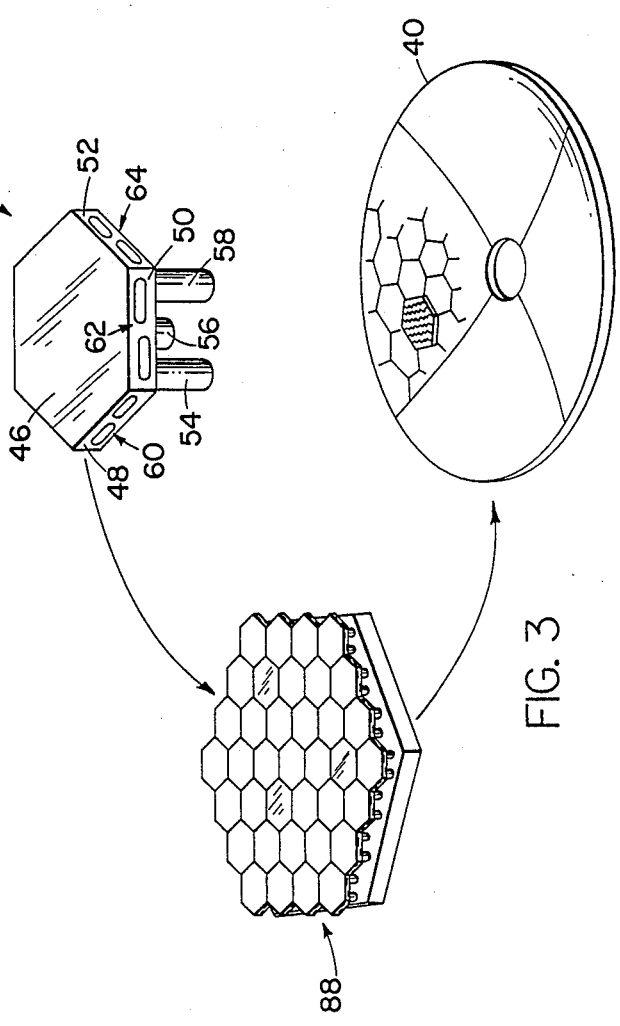
FIG. 3 is an exploded perspective illustration in schematic form of the mirror of FIG. 2.

In FIG. 3, there is illustrated an exploded perspective view, in schematic form, of the segmented mirror 40 of FIG. 2. The mirror is comprised of a large plurality of mirror segments, such as segment 44, which are preferably configured to form a hexagonal mirror surface 46 and side surfaces perpendicular thereto, of which surfaces 48, 50 and 52 are visible.

Each segment is adapted to receive three linear displacement actuators, such as actuators 54, 56 and 58, shown schematically. These actuators can be of a type known in the art, but in the preferred embodiment comprise a differentially wound electromagnetic actuator as disclosed and claimed in the co-owned, co-pending U.S. patent application entitled, "Differentially Wound Electromagnetic Actuator" and incorporated herein by reference.

Additionally seen on each of the segment side surfaces 48, 50 and 52 are pairs 60, 62 and 64 of planar, electrical coils. The coils are part of inductive, parallel plane or sliding segment displacement sensors described and claimed in applicants co-owned, co-pending U.S. patent application entitled "Inductive Displacement Sensor", and incorporated herein by reference. As described hereinafter, the displacement sensors comprise part of the apparatus for positioning adjacent segments so that the mirror surfaces are aligned. Those skilled in the art will note that other possible sensors such as capacitive sensors or optical sensors can also be utilized for the edge matching function.

To arrive at a phased array segment size, the primary factors to be considered are the atmospheric coherence length, $r_o$, along with the mirror system's ambient environment such as geographic site, altitude, local turbulence and the expected high energy laser induced turbulence. Consequently, for wavelengths between 0.5 and 1.0 microns, the optimum segment size is between 2 and 5 centimeters. For longer wavelengths fewer, larger elements may be substituted, although the substantial savings in weight associated with small segments can mandate their use in spite of the larger atmospheric coherence length. The latter weight-saving feature extends the desirability of the small thin segments even to large optical devices in space because of the versitility of the preferred control mechanism, which can control the position of very large numbers of segments. The wavefront sensor resolution does not necessarily have to match the segment size because of the quasi-membrane behavior of the segmented surface.

It may be desirable to have more segments than resolution elements because of the favorable weight-to-size ratio. A large number of small segments may optimize other parameters such as the total structural weight.

Figure 4:
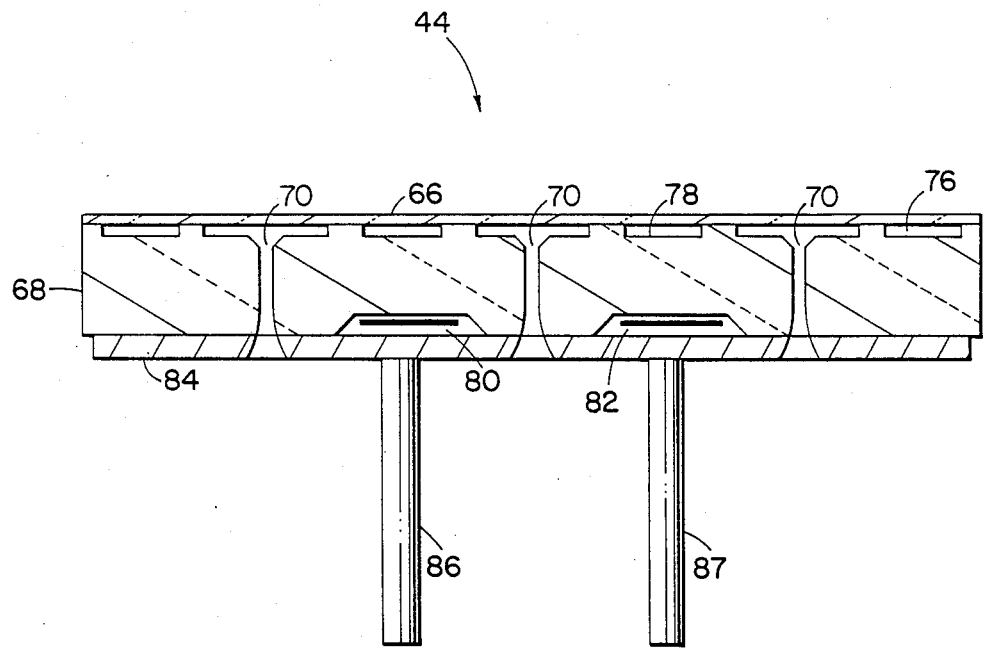
FIG. 4 is a simplified schematic illustration, in section, of a mirror segment of the mirror of FIG. 2.

In the preferred embodiment, the mirror segments are silicon and are manufactured using the batch processing techniques of the semiconductor industry. A six inch silicon wafer is cut or otherwise configured into a plurality of 2 cm hexagonal mirrors. FIG. 4 is a simplified schematic illustration, in section, of mirror segment 44 of FIG. 3 that has been separated from a six inch silicon wafer. The segment 44 comprises mirror front piece 66 bonded in a conventional manner to one of the opposed primary surfaces of segment core 68. The segment core 68 contains coolant inlet ports, such as port 70, and corresponding coolant exhaust vents, such as vents 72 and 74, separated by coolant ducts, of which ducts 76 and 78 are examples. Each segment typically comprises one inlet and three exhaust vents.

The segment core also incorporates in a second primary surface recessed wells 80 and 82 for positioning elements of a segment controller detailed hereinafter, such as integrated circuit dies mounted in conventional flip chip manner. The segment core is then attached to a backing plate 84 which is adapted to receive displacement actuators schematically shown at 86 and 87, as well as provision for interfacing with a coolant supply. Although in a preferred embodiment the mirror segment is cooled, those skilled in the art will note that uncooled segments may be substituted when appropriate. Similarly, the preferred mirror segment core and backing plate are seen to be discrete silicon elements, but those skilled in the art will note that a singular element incorporating these segment elements made from silicon or an equivalent material, such as metal or silicon carbide, may be substituted.

The processing steps required to fabricate a segment as shown in FIG. 4 include fabricating a segment core piece of approximately 2 cm diameter from a six inch silicon wafer. Then the required cooling channels or ducts are fabricated in the core using micromachining techniques. The wafers are separated into individual segment cores and a thin mirror front piece of generally between 0.5 and 1.0 mm in thickness is bonded to the front surface of the core piece. The mirror front piece surface is milled to approximately the desired optical figure of merit. Next, segment side surfaces are shaped and polished, and the integrated circuit dies installed. The mirror front piece is plated, following polishing of the front piece surface to the final optical figure. Lastly, inductive displacement sensor coils are deposited on the side surfaces before the actuators are attached to the backing plate and the segment interfaced with a cooling supply (not shown).

For reasons detailed hereinafter, it is preferable to group each segment in a cluster such as cluster 88, FIG. 3, which is selected to be between 50 and 100 centimeters across. An array of clusters then forms the full aperture of mirror 40. A mirror provided according to the present invention is therefore extendable beyond the size of the aperture shown in FIGS. 2 and 3. In the preferred embodiment the mirror exceeds 10 meters in diameter, with an area greater than 100 square meters having in excess of 100,000 segments. The dynamic range of the mirror along each segment's displacement axis is greater than 100 microns, with better than 10 nanometer positioning accuracy per element. A segmented mirror provided by the present invention has a high power throughput and provides near diffraction limited operation for wavelengths longer than 0.4 microns.

Measuring and controlling an adaptive optic surface comprised of a very large number of independent optical segments is an inherently complex problem. Either the phase or tilt of an incoming wavefront must be measured by the wavefront sensor (36 FIG. 2) and compared mathematically against an ideal wavefront to determine deviations. The wavefront measurements are then used to adjust the segmented mirror surface geometry to generate the conjugate of the incoming wavefront, thereby compensating the outgoing beam for environmentally induced distortions. A wavefront sensor that measures incoming wavefront phase uses very complex hardware and a trivial control algorithm. In contrast a simple, reliable tilt sensing scheme is used in the preferred embodiment in conjunction with a distributed control algorithm devised to utilize each local controller as part of a very fast parallel processing computer.

Various types of adaptive optics applications provide initial constraints on the measurement performed by the sensing apparatus (36 of FIG. 2). With a very high power laser, there exists in some systems a separate sensitive optical measuring system, possibly including a space based beacon, which provides a probe beam to characterize atmospheric turbulence. Alternatively, an imaging telescope may make use of the light passively available from the object being viewed. Consequently, these systems require a multi-wavelength or broadband phase sensing apparatus since the source of the probe beam is typically either broadband or not at the same wavelength as the beam 34. This restraint mandates a continuous or quasi-continuous mirror surface which responds equally to a wide range of wavelengths. Therefore, $2M\pi$ phase ambiguities in the relative phase of individual segments are not acceptable. Moreover, near diffraction limited operation of a mirror system at visible wavelengths requires a closed loop segment correction bandwidth of several kilohertz for typical atmospheric fluctuations. Additional demands for reliability lead to a strong preference for distributed mirror system signal processing, with as much locally autonomous processing within the individual segments as is possible.

Figure 5:
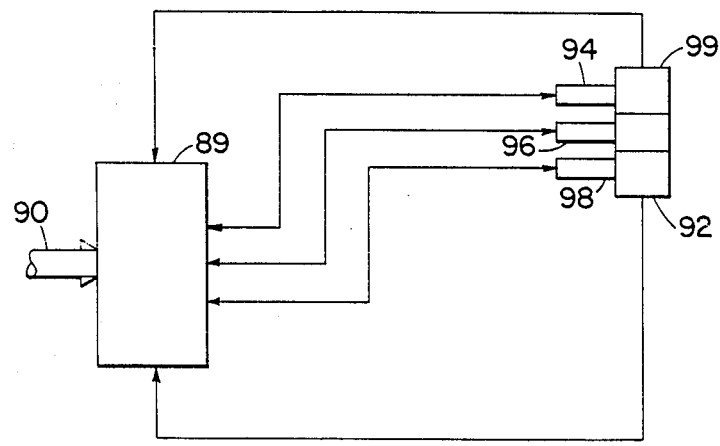
FIG. 5 is a simplified schematic diagram illustrating a segment controller used with the phased array mirror system of FIG. 2.

FIG. 5 is a simplified schematic diagram illustrating a local controller 89 located on an individual segment used with the phased array mirror system of FIG. 2. The segment controller 89 receives signals indicative of wavefront phase or tilt from wavefront monitor 36, on line 90. The controller also receives segment displacement signals from a plurality of segment displacement sensors two of which are indicated generally at 92. Although only two of the preferred edge sensors are indicated in FIG. 5, those skilled in the art will note that each side of segment 99 has a corresponding edge sensor which may be of the preferred type or of an equivalent type. Adjacent segments and sensors have not been illustrated for purposes of clarity. The controller generates actuator control signals in accordance with computational algorithms of the type described hereinafter. In response, the actuators, diagramatically shown at 94, 96 and 98 position segment 99 so as to provide two tilt angles and an average actuator displacement.

One optical phase measuring technique provided according to the present invention is fully segment autonomous, and uses three separate phase measurements per segment to directly control three independent displacement actuators. Each segment has three light collection sub-apertures centered over each of the respective segment actuators. The phase of an incoming laser or electromagnetic beam wavefront is measured with conventional interferometric phase measuring apparatus. Signals indicative of the wavefront phase are provided to the controller on lines 90.

Although theoretically very simple, the phase sensing technique described above is quite difficult to accomplish because of the need to make three unambiguous phase measurements within each approximately 2 centimeter diameter segment. These phase measurements must be made at two separate wavelengths to resolve the $2n\pi$ ambiguities, mandating electronics and optical elements that are very complex and have an extremely high packing density. Moreover, such a system needs to apply a global, highly accurate phase reference at each wavelength for every segment. Because of the low sensitivity afforded by the small available measuring area, a beacon coincident with the laser beam or telescope target and/or local amplification of the signal is required.

An alternative electro-optic phase detection technique for mirror segment control provided according to the present invention mandates a single light collection sub-aperture per segment to provide average phase information. In addition, segment displacement sensors of the type described hereinabove provide signals indicative of segment surface displacement to a control apparatus. The control apparatus determines segment tilt along two axes and generates actuator excitation signals which align edges of adjacent segments, yielding a quasi-continuous surface. This alternative electro-optic technique for wavefront control is more sensitive than the phase sensing technique described hereinabove because a larger area can be used for the phase measurement. This alternative retains the advantage that the computation and control for each segment is fully independent and parallel, resulting in very high segment autonomy and maximum temporal bandwidth.

A preferred electro-optic mirror segment control technique is similar to the one described hereinabove, but directly senses wavefront tilt rather than phase. This technique generates a mirror surface that is characterized as a tilt sensed, tilt-controlled pseudo-membrane (TTPM). Two axis tilt information is generated for each segment by any of a variety of tilt sensors well known in the art. Wavefront phase continuity is preserved by edge matching of adjacent segments using segment displacement sensors. A well known global wavefront tilt sensor, such as a Hartmann-type sensor, is employed in the preferred embodiment. A Hartmann-type global wavefront tilt sensor comprises a Hartmann-wavefront detector and is very precise while also inherently providing a fundamental advantage of sensitivity to white rather than monochromatic light. In a classic Hartmann wavefront detector, a mask having multiple holes is placed in registration with an optical aperture. Light from a distant source illuminates the mask-aperture combination. The converging pencils of light are detected near the image plane. Local tilt is determined from the centroids of the images. For real time wavefront detection, such as with a mirror system provided according to the present invention, a Hartmann-mask cannot be used. Rather, sub-aperture separation is implemented within the wavefront sensor (36, FIG. 2) itself. Generally it is desirable that the subapertures so defined shall match each segment on a one-to-one basis. It is important to note, however, that, since the edge-matching system preserves surface continuity across the plurality of segments, exact one-to-one registration is not essential.

Since wavefront tilt information is basically the local derivative of the required parameter, the wavefront phase, more complex signal processing must be performed by the control apparatus or segment controller in the preferred embodiment. A straightforward mathematical approach to the problem would derive phase directly through the inversion of an extremely large matrix whose number of elements is on the order of the square of the number of mirror segments. A calculation of this type requires a different solution for each permutation of missing or nonfunctioning sensors. This is clearly not reasonable for a system with several hundred thousand elements. However, as discussed hereinafter, a number of algorithms provided according to the present invention can be used which employ wavefront tilt information directly to generate the mirror surface. These algorithms require computation rates substantially higher than the atmospheric bandwidth, but such bandwidth is clearly within existing microprocessor technology capabilities.

Although measuring and controlling an adaptive optic surface is inherently complex, there are possible tradeoffs between hardware and control algorithms. For example, the optical wavefront phase sensing system as described hereinabove uses very complex hardware, and needs only a trivial control algorithm. However, the preferred TTPM technique employs a global tilt sensor array as described hereinabove in conjunction with a more complex computing and control algorithm.

In fact, the individual algorithms used by each segment controller are relatively simple because they must only operate upon signals indicative of two tilt angles and six edge measurements. The microprocessor configured with each local segment controller provides a massive parallel computing capability which greatly exceeds the computing capability of a single dedicated central computer. To test the convergence of an algorithm, an analytic modeling computer program has been developed using simulated atmospherically distorted wavefronts. These algorithms display quantified differences in response time and ultimate surface accuracy. The above modelling program verifies that wavefront tilt sensing combined with segment edge matching converges to an optimum mirror surface, but takes more computation cycles (i.e. more time) than the phase sensed technique.

There is a direct trade-off between sensing complexity (i.e. the amount of sensor input information), and the computation speed required. Tilt sensed algorithms are largely serial in operation, with phase corrections propagating from the edge of the surface of a cluster to its center or vice-versa. The convergence time depends on the number of segments and on the algorithm. Solutions with only individual segment tilt information are the slowest, while increasing the segment tilt and displacement information available decreases convergence time significantly.

For example, if the controller for each segment possesses not only information regarding that segment's mirror surface misalignment compared directly to adjacent segments, but also those of neighboring segments, then the convergence is converted from serial to partly parallel. This process can be arbitrarily extended, exchanging intersegment communications complexity for total surface convergence time, but should be avoided on a single segment communication level. In the preferred embodiment a hierarchical or clustering computing method maximizing throughput and minimizing data communications at each level, coupled with ultrafast Poisson equation solvers produces an optimum solution extendable to nearly any size mirror surface. Those skilled in the art will note that control algorithms employing simple conventional mathematical solution techniques, such as Linear Averaging and Least Squares (RMS), cannot be adapted and substituted because they are too slow.

A theoretical analysis of the problems to be solved by a tilt sensed algorithm shows that it is identical mathematically to a general Poisson equation:

$$(\partial^2 u(x,y)/\partial x^2 + \partial^2 u(x,y)/\partial y^2 = g(x,y)$$

for which numerous intrinsically fast solution algorithms already exist. For example, the fastest known purely sequential Poisson solution is the "Successive Over Relaxation" or SOR method, which does not require any extra data communication between segments. If communication is allowed between adjacent segments, then a second class of Poisson equation solvers becomes applicable, namely, "multi-grid" methods. Algorithms employing these multi-grid methods converge still faster than the SOR algorithm. Examples of "multi-grid" and SOR solution algorithms can be found in a number of textbooks available generally to those skilled in the art.

A logical cluster approach, which is similar to the multi-grid approach detailed above, is used in the preferred embodiment. An algorithm employing this method divides the mirror surface into clusters of segments, and for each cluster simultaneously solves for actuator control signals in an interative manner to configure the mirror into a pseudo-membrane. This process is more easily understood by reference to FIG. 6 which is a simplified schematic view of several segment clusters of the mirror of FIG. 3. With the preferred algorithm, the center of each cluster must first be set to the correct absolute phase. These phases can be determined rapidly by simple summation of tilt data obtained through tilt sensor apparatus detailed hereinabove.

Figure 6:
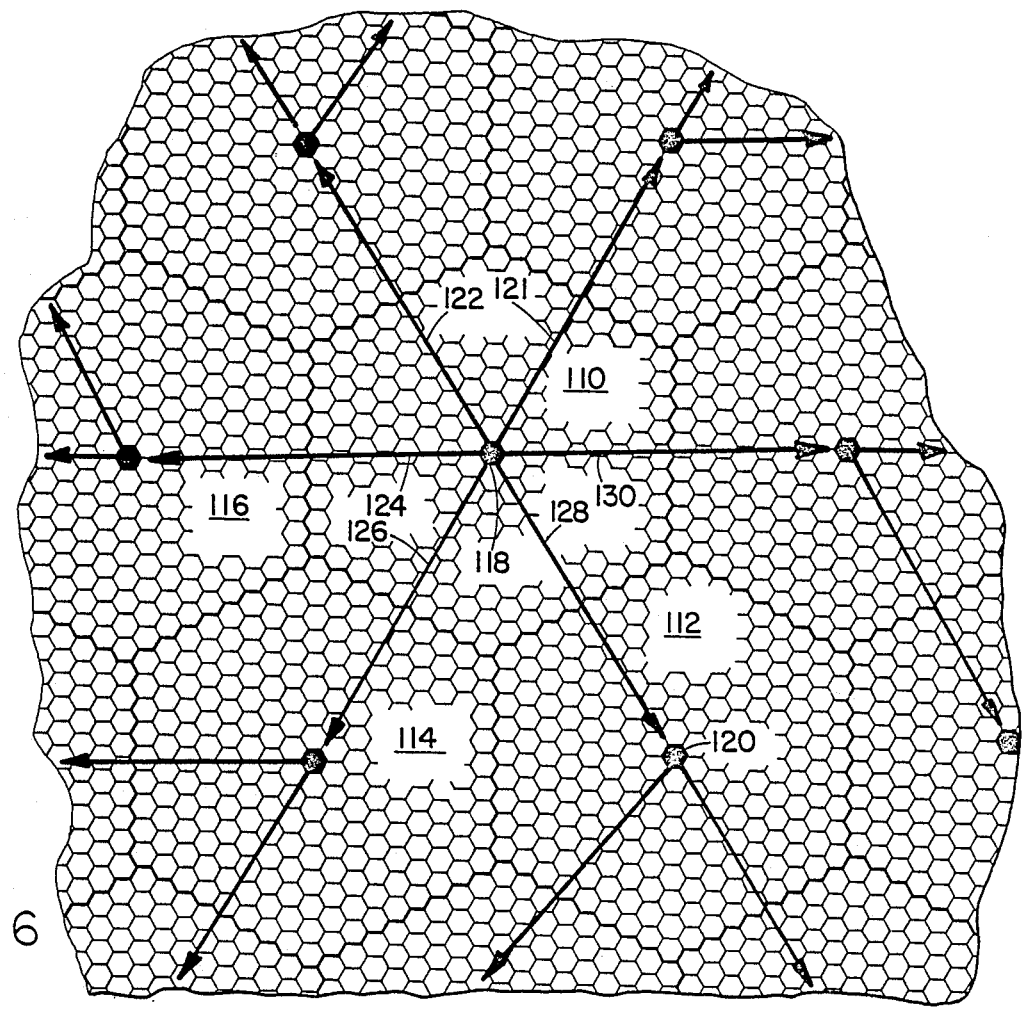
FIG. 6 is a simplified schematic diagram of adjacent segment clusters indicating master segments and possible paths of master segment control communication.

Subsequently, the controller algorithm iterates one of the above Poisson equation solver algorithms to obtain the overall surface solution. In FIG. 6 the mirror is configured into a plurality of interlocking clusters, such as clusters 110, 112, 114 and 116. Each cluster comprises an array of corresponding adjacent segments with a master segment such as master segments 118 and 120 of clusters 110 and 112 respectively. For example, in cluster 110, the TTPM control algorithm uses the reference phase of the master segment and then calculates the appropriate phase for each surrounding segment needed to edge match with the master segment. This calculation is repeated out to the edge of each cluster as shown by arrows 121, 122, 124, 126, 128 and 130, combining at each segment the local tilt data from the global Hartmann sensor.

An order of magnitude calculation indicates that a combination of segment clustering and SOR/multi-grid analysis is adequate. If the atmospheric roll off frequency is 200 hertz and the maximum response of a segment actuator is 40 kilohertz, then about 200 computation cycles are available for the solution. A 100 square meter surface with 2 centimeter elements contains 384,900 segments. In the preferred embodiment the surface is divided into clusters of a few hundred segments each. To solve an SOR solution algorithm for each cluster requires a time proportional to the the square root of the number of elements, (approximately 10-20 cycles, leaving 180-190 cycles to set initial segment phases. Although the hierarchical algorithm mandated by a tilt sensed edge matching technique is complex, the tilt sensing technique is preferred over a phase sensing technique since the complexity of the problem is placed into the computation rather than into the wavefront sensing portion of the solution. A wavefront tilt sensing apparatus is simpler and more reliable than one which senses wavefront phase.

In order to deduce the effect of error propagation, the algorithm can be truncated to a specific mathematical precision. Consequently, the physical limitations of finite transducer resolution, signal to noise ratios and computational accuracy (i.e. employing integer mathematics) can be accommodated.

In a simulated operation of a segment controller, a TTPM algorithm provided by the present invention was coded onto a TMS 32020 high speed digital signal processor. Integer mathematics and assembler level coding were used to obtain the highest possible computational throughput. The results are substantially equal to an equivalent floating point high accuracy calculation, and the simulation requires approximately 5 microseconds to complete. Consequently, those skilled in the art will note that an existing signal processor can easily handle the calculational load of a real mirror segment.

Figure 7:
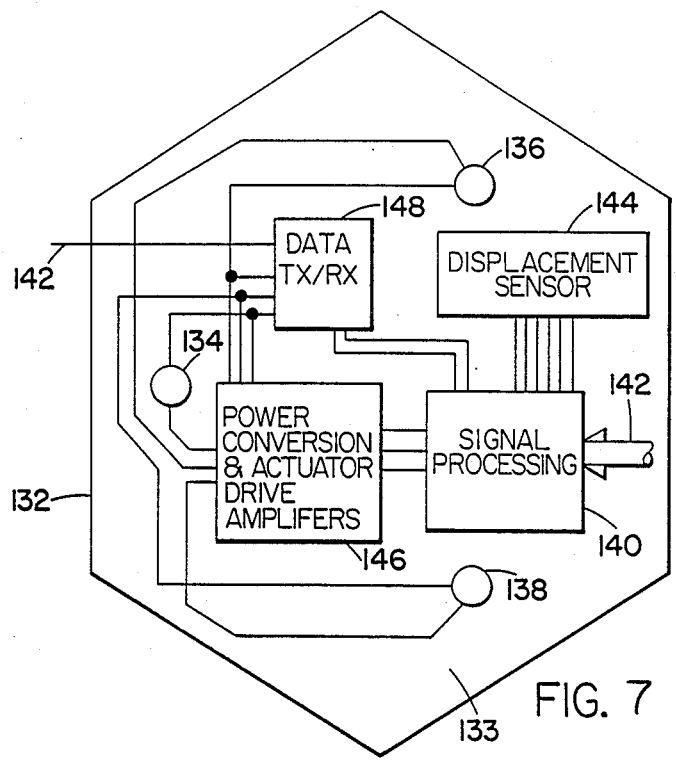
FIG. 7 is a simplified block diagram schematically illustrating the elements of a segment controller used with the segments of the mirror of FIG. 3.

FIG. 7 is a simplified block diagram schematically illustrating the preferred positioning of elements of a segment controller 42 used with the mirror of FIG. 3. As shown in FIG. 7, segment 132 is adapted to receive at back surface 133 three actuators indicated schematically at 134, 136 and 138. Each local controller includes a plurality of components which are affixed to the segments' back surface in a conventional manner, typically flip chip mounting in etched wells. In general, the controller includes a signal processor 140, such as a conventional microprocessor indicated hereinabove. The signal processor is adapted to receive on lines 142 external sensor signals from a sensing apparatus, such as the mirror tilt sensor described hereinabove.

The signal processor also receives signals from segment displacement sensor circuitry 144 such as the inductive displacement sensor described hereinabove. Also included in the local controller are the requisite power conversion and actuator drive amplifiers 146, data transmission and receiving circuitry 148, as well as such other conventional electronics to enable the segment controller to generate actuator excitation signals.

Similarly, although shown hereinabove with respect to the preferred embodiment, those skilled in the art will note that certain additions, substitutions and deletions thereto can be made therein without departing from the spirit and scope of the present invention.

We claim:

1. An active optical element receiving an electormagnetic beam, comprising:
    a plurality of optical segments each having opposed front and rear primary surfaces bounded by a plurality of edges formed by intersection with respective secondary side surfaces, said segments being arranged to collectively receive an electromagnetic beam at said first primary surfaces;
    a plurality of displacement actuators each responsive to control signals affixed to said rear surfaces of said segments to effect linear movement of each segment along a segment axis substantially perpendicular to said front primary surface of its segment and tilting movement relative to said segment axis;
    a sensor means for providing signals indicative of the relative positions of said front surfaces of said segments; and
    control means for providing said actuator control signals in dependence on said sensor signals and command signals that are capable of positioning said segments in real time so that said front surfaces thereof collectively form a surface having an arbitrary geometry.

2. The apparatus of claim 1 wherein said control means further comprises a plurality of segment controllers each of which is locally configured on a respective one of said segments.

3. The apparatus of claim 1 wherein said control means computes, per segment, said actuator displacement signals in accordance with a Poisson equation solver algorithm.

4. The apparatus of claim 3 wherein said Poisson equation algorithm comprises a successive over relaxation algorithm.

5. The apparatus of claim 3 wherein said Poisson equation solver algorithm comprises a multigrid algorithm.

6. The apparatus of claim 1 wherein said control means defines a plurality of segment clusters, each cluster having a central master segment having a plurality of outer segments, said control means receiving signals indicative of a master segment position and iteratively computing from said received signals segment tilt and average actuator displacement values that match said master segment edges with said adjacent segments;

control means subsequently providing actuator displacement signals for remaining outer segments in dependence on said master segment computed values.

7. The apparatus of claim 6 wherein said control means further comprises a plurality of local controllers each configured with a respective one of said segments.

8. The apparatus of claim 7 wherein said adjacent segments are configured in radial rings, each of said segment controllers simultaneously computing corresponding segment tilt and average actuator displacement values for each layer, that match each of said segment edges with the corresponding inner segment edge, each of said segment controllers providing actuator displacement signals in dependence on said computed values.

9. The apparatus of claim 8 wherein said segment controllers displace each of said matched segments to provide phase continuity across cluster boundaries.

10. An extendable large aperture phased array mirror apparatus for guiding an electromagnetic beam having a distorted wavefront, comprising;
   a plurality of mirror segments each having opposed first and second primary surfaces bounded by a plurality of edges formed with respective secondary side surfaces, said segments configured to cooperatively reflect the electromagnetic beam at said first primary surfaces;
   a plurality of displacement actuators each responsive to control signals and each affixed to a corresponding one of said segment plurality second primary surfaces for generating displacement angular segment movement relative to a segment axis substantially perpendicular to said first primary surfaces;
   optical sensor means receiving a portion of the electromagnetic beam wavefront distortion relative to an ideal wavefront; and
   control means receiving said distorted wavefront signals for providing said actuator control signals to position said mirror segments in real time so that said first surfaces thereof generate a phase conjugate electromagnetic beam.

11. The apparatus of claim 10 wherein said sensor means comprises a wavefront phase sensing apparatus.

12. The apparatus of claim 11 wherein said wavefront sensing apparatus interferometrically determines said wavefront phase.

13. The apparatus of claim 10 wherein said control means further comprises a plurality of segment controllers each of which is locally configured with a respective one of said segments.

14. The apparatus of claim 10 wherein said sensor means further comprises per segment apparatus for providing signals indicative of an average segment wavefront phase and comprising displacement sensors between adjacent segments for determining displacement therebetween.

15. The apparatus of claim 14 wherein said control means receives said average wavefront phase signals and said segment displacement signals, computes average actuator displacement and segment tilt values and provides actuator signals indicative thereof.

16. The apparatus of claim 10 wherein said sensor means comprises a wavefront tilt sensing apparatus for determining wavefront tilt across the mirror.

17. The apparatus of claim 16 wherein said wavefront tilt sensing apparatus comprises a Hartmann-type tilt sensor.

18. The apparatus of claim 16 wherein said control means further comprises segment displacement sensors for determining displacement between adjacent segments.

19. The apparatus of claim 18 wherein said controller means computes from said tilt signals and said displacement sensor signals actuator displacement signals for positioning said segments' first primary surfaces.

20. The apparatus of claim 19 wherein said control means computes, per segment, said actuator displacement signals in accordance with a Poisson equation solver algorithm.

21. The apparatus of claim 19 wherein said control means defines a plurality of segment clusters each cluster having a central master segment and a plurality of outer segments, said control means receiving signals indicative of a segment reference phase for said master segment and iteratively computing from said received signals segment tilt and average actuator displacement values that align said master segment edges with said adjacent segments;
   said control means subsequently providing actuator displacement signals for remaining outer segments in dependence on said master segment computed values.

22. The apparatus of claim 21 wherein said control means further comprises a plurality of local controllers each configured with a respective one of said segments.

23. The apparatus of claim 22 wherein said adjacent segments are configured in radial rings, each of said segment contorllers simultaneously computing corresponding segment tilt and average actuator displacement values for each ring that match each of a segments edges with the corresponding inner segment edge, each of said segment controllers providing actuator displacement signals in dependence on said computed values.

24. The apparatus of claim 23 wherein said segment controllers displace each of said matched segments to provide wavefront phase continuity across cluster boundaries.

25. The apparatus of claim 24 wherein said wavefront sensing apparatus interferometrically determines said wavefront phase.

26. The apparatus of claim 19 wherein said control means is further capable of generating said actuator control signals without reconstructing said distorted wavefront.

27. The apparatus of claim 10 wherein said displacement actuators have a stroke of approximately 100 microns.

28. The apparatus of claim 20 wherein said control means further comprises means for computing said actuator displacement signals in accordance with a successive over relaxation (SOR) algorithm.

29. The apparatus of claim 20 wherein said control means further comprises means for communicating between segments relative segment position and comprises a means for computing said actuator displacement signals with a multi-grid algorithm.

30. The apparatus of claim 21 wherein said control means further comprises means for computing said actuator displacement signals in accordance with a successive over relaxation (SOR) algorithm.

31. The apparatus of claim 21 wherein said control means further comprises means for communicating relative segment position therebetween and comprises a means for computing said actuator displacement signals with a multi-grid algorithm.

32. The apparatus of claim 22 wherein said local segment controllers further comprise a microprocessor, power conversion circuitry, and displacement sensor circuitry.

33. The apparatus of claim 13 wherein each of said plurality of segment controllers communicates with neighboring segment controllers.

34. A mirror segment for use with a segmented mirror comprises of a plurality of mirror segments and having a means for controlling the relative position thereof, comprising:
- a rigid mirror element having first and second opposed primary surfaces, said first primary surface for guiding an electromagnetic beam; and
- a segment core adapted to receive said mirror element second surface at a first core primary surface, said core having a second primary surface opposite said core first primary surface and adapted to receive components of the control means;
- said mirror element and said core each further comprising minor surfaces configured to cooperate with corresponding surfaces on adjacent ones of the segment plurality.

35. The mirror segment of claim 34 wherein said mirror element and segment core comprises silicon.

36. The mirror segment of claim 34 wherein said mirror element and segment core comprise silicon carbide.

37. The mirror segment of claim 34 wherein said mirror element and segment core comprise metal.

38. The mirror segment of claim 34 wherein said mirror element and segment core comprise dielectric material.

39. The mirror segment of claim 34 wherein said mirror element and segment core comprise composite material.

40. The mirror segment of claim 34 wherein said mirror element and segment core comprise a metal/composite material assembly.

41. The mirror segment of claim 34 wherein said core further comprises cooling means adapted to receive and discharge coolant, said cooling means for maintaining said mirror element at a preselected temperature.

42. An optical system for guiding an electromagnetic beam having a distorted wavefront, comprising:
- a plurality of mirrors, including a primary mirror comprised of segments each having opposed first and second primary surfaces bounded by a plurality of edges formed with respective secondary side surfaces, said segments configured to cooperatively reflect the electromagnetic beam at said first primary surfaces;
- a plurality of displacement actuators each responsive to control signals and each affixed to a corresponding one of said segment plurality second primary surfaces for generating displaced angular segment movement relative to a segment axis substantially perpendicular to said first primary surfaces;
- optical sensor means receiving a portion of the electromagnetic beam for providing signals indicative of the electromagnetic beam wavefront distortion relative tn an ideal wavefront; and
- control means receiving said distorted wavefront signals for providing said actuator control signals to position said mirror segments in real time so t at said first surfaces thereof generate a phase conjugate electromagnetic beam.

43. An optical system for guiding an electromagnetic beam comprising:
- a plurality of mirrors including a mirror comprised of segments each having opposed first and second primary surfaces bounded by a plurality of edges formed with respective secondary side surfaces, said segments configured to cooperatively reflect the electromagnetic beam at said first primary surfaces;
- a plurality of displacement actuators each responsive to control signals and each affixed to a corresponding one of said segment plurality second primary surfaces for generating displacement angular segment movement relative to a segment axis substantially perpendicular to said first primary surfaces;
- a means for providing to said first primary surfaces a reference beam having an ideal wavefront;
- an optical sensor means receiving a portion of the reference beam reflected from said primary surfaces for providing signals indicative of wavefront distortion in said ideal wavefront;
- a control means receiving a said sensor signals for providing said actuator control signal to position said mirror segments in real time to remove said ideal wavefront distortion.

* * * * *

UNITED STATES PATENT AND TRADEMARK OFFICE
CERTIFICATE OF CORRECTION

PATENT NO. : 4,825,062
DATED : April 25, 1989
INVENTOR(S) : Rather et al.

It is certified that error appears in the above-identified patent and that said Letters Patent is hereby corrected as shown below:

Column 1

Line 17, delete "wave lengths" and substitute--wavelengths--.

Line 52, delete "ever" and substitute--even--.

Column 2

Line 5, delete "stroke" and substitute--strokes--.

Column 5

Line 39, delete "wave lengths" and substitute--wavelengths--.

Line 41, delete "wave length" and substitute--wavelength--.

Column 6

Line 26, after "wavelengths" insert--,--.

Line 32, delete "versitility" and substitute--versatility--.

UNITED STATES PATENT AND TRADEMARK OFFICE
CERTIFICATE OF CORRECTION

PATENT NO. : 4,825,062
DATED : April 25, 1989
INVENTOR(S) : Rather et al.

It is certified that error appears in the above-identified patent and that said Letters Patent is hereby corrected as shown below:

Column 7

Line 31, after "embodiment" insert --,--.

Line 45, after "36" insert --,--.

Line 54, after "contrast" insert --,--.

Line 61, after "36" insert --,--.

Line 61, delete "of".

Column 8

Line 32, delete "diagramatically" and substitute --diagrammatically--.

Column 9

Line 37, delete "subapertures" and substitute --sub-apertures--.

Column 11

Line 24, after "112" insert --,--.

Line 40, after "embodiment" insert --,--.

Line 43, delete the second occurrence of "the".

UNITED STATES PATENT AND TRADEMARK OFFICE
CERTIFICATE OF CORRECTION

PATENT NO. : 4,825,062
DATED : April 25, 1989
INVENTOR(S) : Rather et al.

It is certified that error appears in the above-identified patent and that said Letters Patent is hereby corrected as shown below:

Column 12

Lines 32 and 33, delete "electormagnetic" and substitute--electromagnetic--.

Line 67, delete "multigrid" and substitute--multi-grid--.

Column 13

Line 30, delete ";" and substitute--:--.

Column 14

Line 40, delete "contorllers" and substitute--controllers--.

Line 42, delete "segments" and substitute--segment's.

Column 15

Line 24, delete "and".

Line 29, after ";" insert--and--.

Line 49, delete "-".

UNITED STATES PATENT AND TRADEMARK OFFICE
CERTIFICATE OF CORRECTION

PATENT NO. : 4,825,062
DATED : April 25, 1989
INVENTOR(S) : Rather et al.

It is certified that error appears in the above-identified patent and that said Letters Patent is hereby corrected as shown below:

Column 16

Line 21, delete "tn" and substitute --to--.

Line 24, delete "t at" and substitute --that--.

Line 48, delete "a".

Line 49, delete "signal" and substitute --signals--.

Signed and Sealed this

Sixteenth Day of January, 1990

Attest:

JEFFREY M. SAMUELS

Attesting Officer    Acting Commissioner of Patents and Trademarks